Oct. 26, 1943.    M. C. SPENCER    2,332,611
ELECTRICAL CONTROL SYSTEM
Filed March 12, 1942    2 Sheets-Sheet 1

*INVENTOR.*
*MILLARD C. SPENCER*
BY *Hoguet, Neary & Campbell*
*ATTORNEYS*

Oct. 26, 1943.    M. C. SPENCER    2,332,611
ELECTRICAL CONTROL SYSTEM
Filed March 12, 1942    2 Sheets-Sheet 2
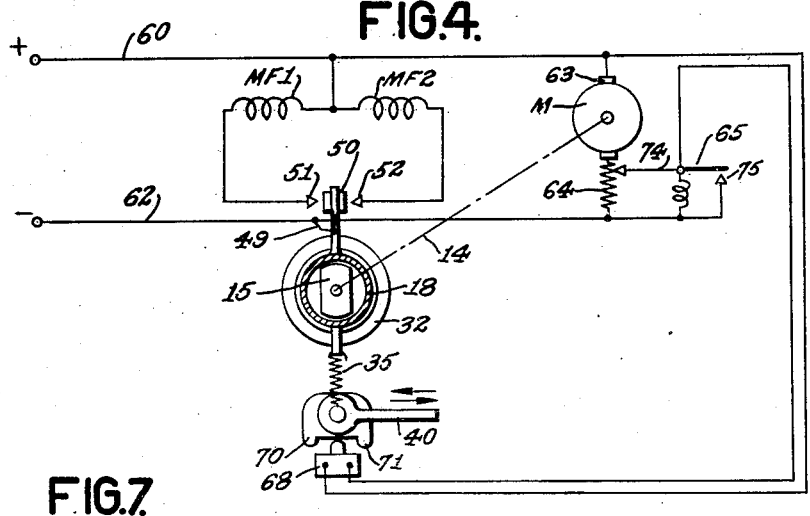
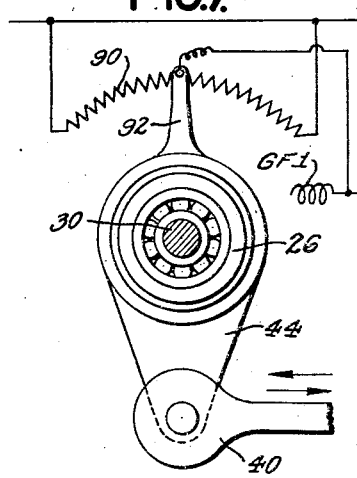
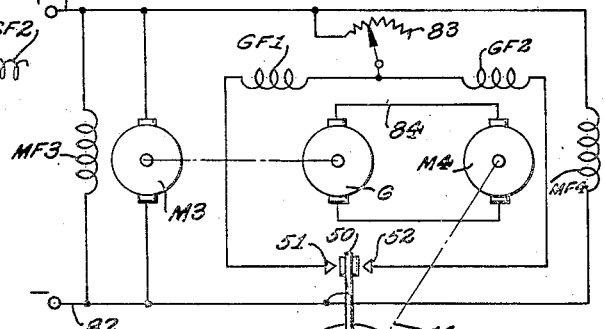
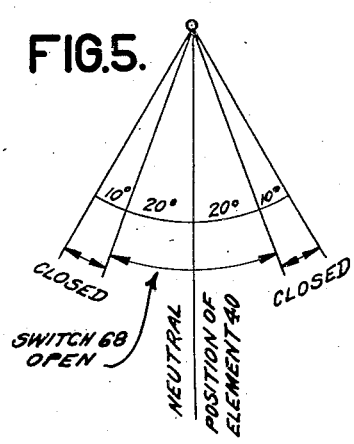
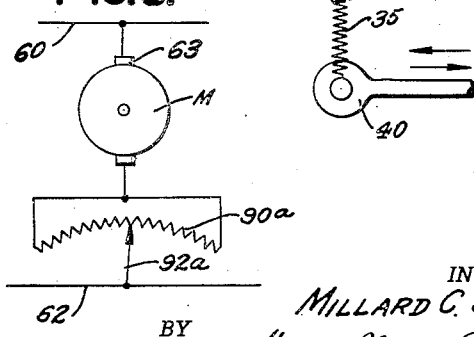
INVENTOR.
MILLARD C. SPENCER
BY Hoquet, Neary & Campbell
ATTORNEYS Patented Oct. 26, 1943

2,332,611

UNITED STATES PATENT OFFICE 2,332,611

ELECTRICAL CONTROL SYSTEM

Millard C. Spencer, East Orange, N. J., assignor to Crocker-Wheeler Electric Manufacturing Company, Ampere, N. J., a corporation of New Jersey Application March 18, 1942, Serial No. 434,815

7 Claims. (Cl. 171—229)

This invention relates to means for controlling the operation of a motor, and an object of the invention is to provide a motor control having an especially wide range of control over the operation of the motor.

I accomplish this wide control ratio by providing the control circuit of the motor to be controlled with force transmitting means operated by opposing forces applied thereto from a control element and the motor to be controlled. Actuation of the control element from a given position is adapted to exert a resilient force operable to effect closure of the control circuit. A torque is developed by operation of the motor and transmitted in opposition to the resilient force applied by the control element. When the resilient force is overcome by the developed torque which increases with increase of motor speed, the motor controlling circuit is opened. When the transmitted torque becomes less than the applied force of the control element the circuit is again closed. In operation this closing and opening of the control circuit occurs at a rate sufficiently rapid to cause the motor to assume a smooth operation at a speed corresponding to the position of the control element.

More particularly, the control circuit of the system may comprise either the field circuit of the motor to be controlled, the armature circuit thereof or both. Where a motor-generator set is used, such as is commonly used in elevator systems, the field circuit of the generator may best be selected as the controlling circuit. Whichever circuit is selected, the circuit is provided with control contacts, and where two such circuits are provided for selective operation of the motor in either of two directions, one movable contact may be provided to control both circuits.

The means for transmitting force or torque developed by motor operation may comprise either mechanical means, electrical means or a combination thereof. Whichever means are selected, the transmission means preferably comprise two parts, one part being adapted to be driven by the motor and a second part being arranged to control, in conjunction with the control element, the operation of the movable contact of the controlling circuit or circuits, as the case may be.

The control element may be actuated manually or by instruments. When the control element is moved from a given position, it is adapted to exert a resilient force upon the movable contact so as to effect closure of a controlling circuit. When the motor accelerates to a speed sufficient to develop and transmit to the part associated with the movable contact a force capable of overcoming the resilient force applied thereto by the control element, the movable contact opens the controlling circuit. The opening of the circuit tends, of course, to slow the motor, thereby reducing correspondingly the transmitted force from the motor driven part to the part associated with the movable contact and thus permitting the resilient force to again close the circuit. This opening and closing of the control circuit is rapid due to the light inertia of the part associated with the movable contact. It is the light inertia of the movable contact part together with the opposing forces of the motor and the control element that results in smooth operation of the motor at speeds which correspond to selected positions of the control element.

Variation of the control may be had by providing different parts of the controlling circuits with variable resistances to be manually controlled or controlled in conjunction with movement of the control element or other means.

The control means of my invention provides for minute changes in angular position of the motor and the speed of operation of the motor. The wide range of control of my invention may be used in many motor applications and is particularly desirable in the control of electric motor drives for gun turrets. A speed range or control ratio in the neighborhood of 200 to 1 is desired for present day gun turret operation. The speed of electric motors may be varied by weakening the field thereof, but that only provides in most cases a range of 3 or 4 to 1, and in extreme cases, about 6 to 1. This ratio has been improved by using a motor-generator set, a speed range being obtained thereby of about 30 to 1. My control system provides a speed range control far exceeding the ratios of these existing motor control systems, and can even exceed the 200 to 1 ratio desired for gun turret operation.

For a better understanding of the invention reference may be had to the following detailed description to be read in connection with the accompanying drawings, in which:

Fig. 4 is a diagrammatical illustration of a circuit suitable for a motor provided with the control means of the invention;

Fig. 5 is a diagram indicating the relationship of the control element of the present invention and a relay control hereinafter described;

Fig. 6 is a diagrammatical illustration of a circuit suitable for application of the control means of the present invention to a motor-generator set;

Fig. 7 is a vertical sectional view of a part of the control means shown in control of a variable resistance which may comprise a part of the controlling circuit; and Fig. 8 is a diagrammatical illustration of a modified armature circuit for the system shown in Fig. 4.

Figure 1:
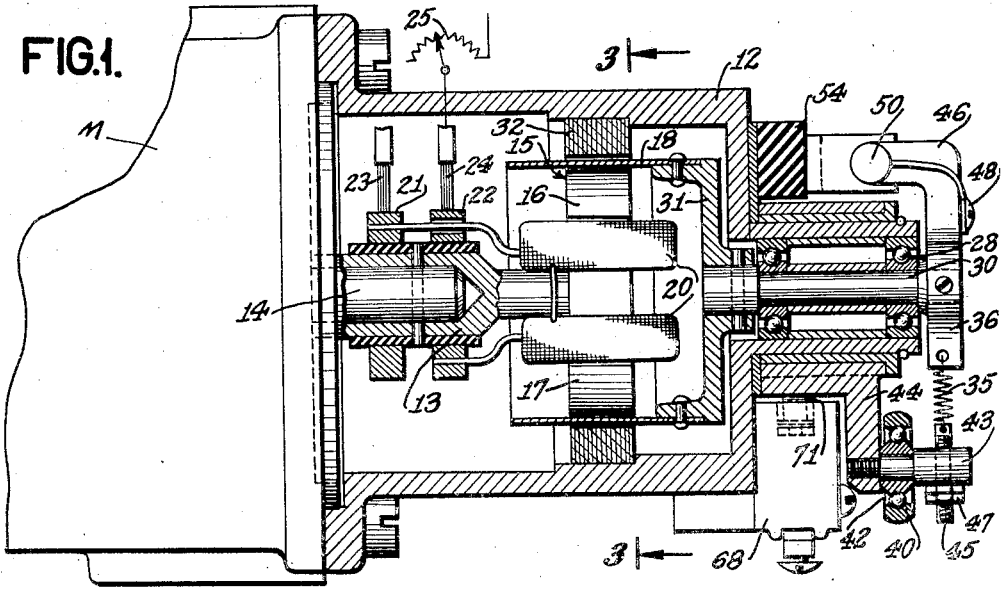
Fig. 1 is a vertical sectional view of the control means of the present invention applied to a motor to be controlled.
Figure 2:
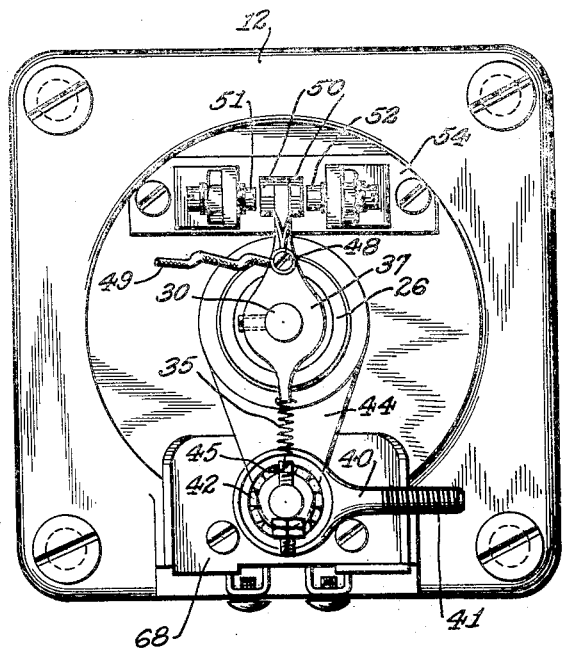
Fig. 2 is a view in vertical elevation of the right hand end of the control means shown in Fig. 1.
Figure 3:
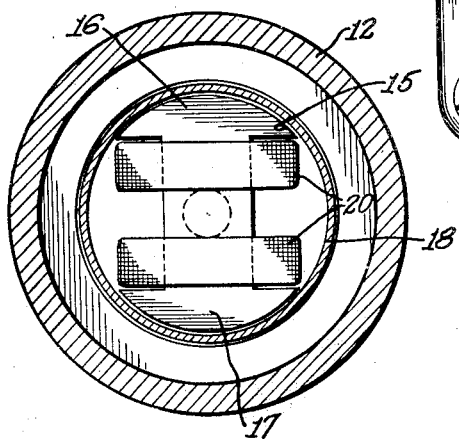
Fig. 3 is a vertical sectional view taken substantially along line 3—3 of Fig. 1.

Referring to Figs. 1, 2 and 3 of the drawings, a motor M is shown provided with a housing 12 attached to one end thereof and co-axially of the motor shaft 14. The shaft 14 is provided with a force transmitting means which, for purposes of illustration, may comprise induction means including a magnet 15 supported by a coupling 13 on the shaft 14 and a cylindrical conductor 18 made of copper, aluminum or any other suitable conducting material. The magnet 15 has two poles 16 and 17 and may be of permanent magnetism or it may be provided with windings 20 to which direct current may be applied through slip rings 21, 22 and brushes 23, 24. If desired, the voltage of the direct current may be controlled by a variable resistance 25.

The housing 12 is provided with a boss 26 adapted to support a bearing 28 to journal a shaft 30 carrying at one end thereof a flanged coupling 31 to which the cylindrical conductor 18 is connected. The cylindrical wall of the conductor 18 is disposed between the path of movement of the poles 16 and 17 and an iron ring 32. The iron ring, which may be laminated as indicated in Fig. 1, is supported on the housing 12 and completes a circuit between the poles 16 and 17 for the flow of magnet flux. The magnetic flux flows from say pole 16 through the wall of the cylinder 18 and the air gaps thereadjacent into the iron ring 32, then along the ring to adjacent the pole 17 where it again passes through the wall of the cylinder 18 and the air gaps thereadjacent to the pole 17.

As the motor rotates the magnetic flux cuts along through the walls of the cylinder 18 and generates electromotive force in the metal thereof causing currents to flow in the walls. The reaction of these currents to the rotating magnetic field tends to drag the cylinder in the direction of movement of the field and thereby transmits a torque to the shaft 30. The shaft 30, however, is restrained against rotation by a resilient connection including a spring 35 interconnecting an arm 36 of a yoke 37 carried on the shaft 30, and a control element 40.

The control element 40 is supported by a bearing 42 on a pin 43 carried by an arm 44 which is rotatably mounted on the boss 26 of the housing 12. The element 40 may be connected by threads 41 to any suitable lever or other connection whereby the control may be actuated manually or by instruments. The spring 35 is provided with a threaded element 45 adjustably attached by nuts 47 to the pin 43.

The yoke 37 has a second arm 46 provided with an electrical contact 50 disposed between a pair of stationary contacts 51 and 52. The contacts 51 and 52 are adjustably supported on an insulated block 54 secured on the housing 12. The arm 46 has a post 48 to which a flexible cable 49 may be connected to the contact 50.

The stationary contacts 51 and 52 are shown in Fig. 4 to be the terminal ends of two parallel field circuits for the motor M. These circuits contain field windings MF1 and MF2, respectively, one of the windings being adapted to cause the motor to operate in one direction and the other to cause the motor to operate in the opposite direction. The two circuits are connected to a lead line 60 and the contact 50 is connected by the flexible connection 49 to another lead line 62. The armature 63 of the motor M is connected across the lead lines 60 and 62 in series with a resistance 64, the resistance functioning to maintain the armature current at a safe value as when the motor is stationary.

In operation the motor is started by movement of the control element 40 to the right or left, as viewed in Figs. 2 and 4, thereby imposing a resilient force through spring 35 to the shaft 30 and transmitting a movement to the arm 46 and the cylinder 18. This resulting movement of the arm 46 causes the contact 50 to engage the contact 51 and 52, as the case may be, thereby completing the circuit through one of the field coils MF1 or MF2. The field coil thus energized produces a torque on the armature of the motor. As the armature rotates and accelerates in speed a torque which gradually increases with increase of speed is imposed upon the cylinder 18 by the rotating field of the magnet 15. When the torque imposed upon the cylinder overcomes the resilient force imposed thereupon by the control element 40, the cylinder tends to move against the tension of the spring and disengage the contact 50, deenergizing the field of the motor. The deenergization of the field tends immediately to slow the motor armature and thereby avoid overspeeding. Since any slowing down of the armature decreases the induction torque upon the cylinder 18 the tension of the spring 35 quickly exceeds the decreasing torque developed in the cylinder 18 and reengages the contact 50 with the stationary contact and thereby reenergizes the field coil. A rapid closing and opening of the contacts results and a smooth motor operation at a speed corresponding to the position to which the control element 40 has been moved is obtained.

The lack of "hunting" in the motor operation once it accelerates to the desired speed is believed largely due to the low inertia of the parts carried by the shaft 30. By maintaining these parts light in weight the control is rendered highly sensitive and smooth motor operation is effected.

Should the control element be moved further from its neutral position, the speed of the motor will be increased correspondingly. Likewise, when the control element is moved back to neutral position, the field coil of the motor is deenergized and the motor brought to a stop. The same applies regardless of which direction the control element 40 is moved. When the element is moved to the right, as viewed in Figs. 2 and 4, the field MF1 is energized and the motor rotates clockwise, and when the element is moved to the left, the field MF2 is energized and the motor rotates counterclockwise.

The motor speed may be adjusted for any given position of the control element by adjustment of the resistance 25 (Fig. 1). Variation of the resistance 25 changes the voltage of the current in the windings 20 and produces corresponding variation in the field strength of the electromagnet 15. Since the strength of the magnet controls the torque transmitted between the magnet and the cylinder 18, a higher speed will result for a given position of the control 40 when the magnet 15 is weakened, and likewise, a slower speed will result when the magnet is strengthened.

The resistance 64 in the armature circuit determines the initial torque of the motor. The resistance 64 may remain fixed or it may be reduced or cut out entirely where high speed is desired quickly. This I do by providing a relay 65 controlled by a self-opening switch 68 which is actuatable by cam surfaces 70 and 71 carried on the arm 44 (Figs. 1, 2 and 4).

In Fig. 5 a chart is shown indicating the range of movement of the control element 40 and in which parts of the movement the element actuates the switch 68. When the element 40 is moved to the right or left for a distance, say within about 20°, the switch 68 is not closed. Should, however, the control be moved beyond 20° to bring the motor to a higher speed, the cam surface 70 or 71, as the case may be, is adapted to actuate the switch 68 and thereby close the circuit to the relay 65, whereby the resistance 64 is shorted out of the armature circuit by line 74 and the contacts 75.

In the diagram shown in Fig. 6 a circuit is shown for a motor-generator set. The generator G is driven by any suitable source of power, such as motor M3, the armature and the field MF3 of which may be connected across the leads 80 and 82. Two field circuits GF1 and GF2 are provided for the generator G. Contacts 51 and 52 form terminals for the field coils and the movable contact 50 is adapted to engage one or the other to complete the circuits in the same manner as hereinbefore described in connection with Figs. 1 to 5. The two field circuits GF1 and GF2 are connected through a variable resistance 83 to the lead 80 and the movable contact 50 is connected to the lead 82.

The generator circuit 84 is connected across the armature of the motor M4. Also connected across the leads 80 and 82 is a field MF4 for the motor M4. The motor control means is associated with the shaft 14a of the motor M4.

When the system is put into operation, the motor M3 drives the generator G at a constant speed. When it is desirable to start the motor M4 and bring it to a desired speed in one or the other direction, the control 40 is moved in the desired direction to close the contacts of one or the other of the field circuits GF1 and GF2. The energization of the field circuits determine the polarity of the current in the generator circuit 84, the polarity thereof being opposite for the two different fields. Thus, energization of the field GF1 will cause the motor M4 to rotate in one direction while energization of the field GF2 is adapted to cause the motor to rotate in the opposite direction. The strength of the generator fields and therefore the voltage of the generator current may be varied by reducing or increasing the resistance 83. This may be done either in conjunction with the movement of the control element 40 or separately by manual means or by instruments.

In Fig. 7, I have shown a variable resistance 90 controlled by an arm 92 suitably connected to the member 44 of the control element 40. This variable resistance may be substituted for the variable resistance 83 and, if desired, it may be substituted, as indicated in Fig. 8, for the resistance 64 in the armature circuit of the system shown in Fig. 4.

In the motor-generator system of Fig. 7, the voltage of the field coils GF1 and GF2 is controlled in accordance with the movement of the control element 40. Thus, the voltage of the current applied to the field coils is automatically adjusted to the speed for which the control is set. For low speeds the voltage on the coils will be low and for high speeds the voltage will be correspondingly higher.

In the case of the motor system of Fig. 4, modified as indicated in Fig. 8, the automatic control by the element 40 of the resistance 90a through the arm 92a insures a maximum resistance for the armature circuit when the element 40 is in neutral position and proportionally reduced resistance as the element 40 is moved away from neutral position.

The induction control feature of my invention is particularly desirable since it has no teeth, slots or commutator bars to interfere with its sensitiveness. Further, since the currents developed due to the induction flow in the metal cylinder there is no danger of the control means burning out at high speeds.

While I have shown and described one embodiment of the control means and certain variations and applications thereof, I recognize that many additional modifications and adaptations are possible without departing from the invention. It should, therefore, be understood that the embodiment and applications of the invention herein illustrated and described are intended to be illustrative only and not as limiting the scope of the appended claims.

I claim:

1. A control system for a shunt motor having a shunt field circuit and an armature circuit comprising contacts adapted to be connected in said shunt field circuit to control the operation of the motor, speed responsive means including two parts, one of said parts to be driven by said motor to impart to the second part a force proportional to the speed of said motor and the second of said parts to control the closing and opening of said contacts, control means actuatable to apply a resilient force to said second part to close said contacts, said second part being adapted to open said contacts at a predetermined motor speed upon transmission thereto from said one part of a force sufficient to overcome said resilient force, a resistance for the armature circuit of said motor, contacts closable by a predetermined movement of said control means, and a relay energizable by the closing of the last named contacts to reduce the amount of said resistance.

2. A motor control comprising two spaced stationary contacts and a movable contact therebetween, one of said stationary contacts and the movable contact being in a circuit which when closed operates the motor in one direction and the other of said stationary contacts and the movable contact being in a circuit which when closed operates the motor in a different direction, speed responsive means including two parts, one of said parts to be driven by said motor to impart to the second part a force proportional to the speed of said motor and the second of said parts to be connected to said movable contact, control means actuatable to apply a resilient force to said second part to close said movable contact with one or the other of said stationary contacts, said second part being operable to open the contacts at a predetermined motor speed upon transmission thereto from said one part of a force sufficient to overcome said resilient force, a resistance in the armature circuit of said motor, a relay operable when energized to reduce said resistance, contact means to control said relay, and means associated with said control means to close said contact means whenever said control means is moved a predetermined distance from a given position in either of two directions.

3. A motor control comprising contacts adapted to be connected in circuit to control the operation of a motor, speed responsive means including two parts, one of said parts to be driven by said motor to impart to the second part a force proportional to the speed of said motor and the second of said parts to control the closing and opening of said contacts, control means actuatable to apply a resilient force to said second part to close said contacts, said second part being adapted to open said contacts upon transmission thereto from said one part of a force sufficient to overcome said resilient force, a resistance in said circuit, a relay operable to change said resistance, and means associated with said control means to energize said relay should said control means be moved a predetermined distance from a given position.

4. A motor control comprising a shunt field circuit for a motor the operation of which is to be controlled, said circuit having contacts to control the energization thereof, speed responsive means including two parts, one of said parts to be driven by said motor to impart to the second part a force proportional to the speed of said motor and the second of said parts to control the closing and opening of said contacts, control means actuatable to apply a resilient force to said second part to close said contacts, a resistance for the armature circuit of said motor to maintain the current thereof at a safe value when the field circuit is deenergized, and said second part being adapted to open said contacts at a predetermined motor speed upon transmission thereto from said one part of a force sufficient to overcome said resilient force.

5. A control system for a motor having a shunt field winding, comprising, contacts in the circuit of said shunt field winding, a control element, means responsive to the difference between a force from the control element and an opposing force proportional to the speed of said motor for closing said contacts to energize said field winding when said motor speed is less than a predetermined value for which the control element is set, and for opening said contacts to deenergize the field winding when the motor speed is greater than said predetermined value, and a resistance in the armature circuit of said motor for limiting the armature current to a safe value when said field winding is deenergized.

6. A control system for a motor having an armature circuit and a shunt field circuit comprising, contacts for opening and closing said shunt field circuit, a control element including resilient means for applying a force to maintain said contacts closed, means for opposing the force applied by the resilient means with a force proportional to the speed of said motor, thereby opening said contacts whenever a predetermined motor speed is exceeded, and a resistance in said armature circuit to limit the current thereof to a safe value when said shunt field circuit is opened.

7. A shunt motor control system comprising two spaced stationary contacts having a movable contact therebetween, one of said stationary contacts and the movable contact being in the circuit of a first shunt field winding, which, when closed, operates the motor in one direction, and the other of said stationary contacts and the movable contact being in the circuit of a second shunt field winding, which, when closed, operates the motor in a different direction, adjustable control means including a resilient member for applying a variable force to said movable contact to cause it to engage one or the other of said stationary contacts, depending on the direction of operation desired, thereby closing the shunt field circuit corresponding thereto, means for applying to said movable contact a force which opposes the force applied thereto by said resilient member and which is a function of the speed of said motor, thereby opening said shunt field circuit whenever a predetermined motor speed is exceeded, and a resistance in the circuit of said armature for maintaining the current thereof at a safe value when said shunt field circuits are deenergized, whereby variable speed control of said motor in either direction of operation may be achieved by adjusting said control means.

MILLARD C. SPENCER.